United States Patent
Sung

(10) Patent No.: US 7,488,918 B2
(45) Date of Patent: Feb. 10, 2009

(54) METHOD AND APPARATUS FOR MANUFACTURING PRINTED LIGHT GUIDE PLATE

(75) Inventor: Chang-Chih Sung, Tu-Chen (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 804 days.

(21) Appl. No.: 10/769,256

(22) Filed: Jan. 29, 2004

(65) Prior Publication Data

US 2004/0185175 A1 Sep. 23, 2004

(30) Foreign Application Priority Data

Jan. 29, 2003 (TW) .............................. 92101908 A

(51) Int. Cl.
F21V 8/00 (2006.01)
F21V 7/04 (2006.01)
B05D 5/06 (2006.01)
H05B 3/68 (2006.01)

(52) U.S. Cl. .................... 219/390; 219/443.1; 219/521; 118/725; 362/26; 362/608; 362/627

(58) Field of Classification Search ................ 219/406, 219/520, 509, 544, 553; 362/23, 26, 31
See application file for complete search history.

(56) References Cited

U.S. PATENT DOCUMENTS

| | | | | |
|---|---|---|---|---|
| 4,855,572 A | * | 8/1989 | Wallgren et al. | ......... 219/444.1 |
| 6,254,244 B1 | * | 7/2001 | Ukai et al. | .................. 362/611 |
| 6,601,961 B1 | | 8/2003 | Masaki | |
| 6,861,184 B2 | * | 3/2005 | Kawase | .......................... 430/7 |
| 7,061,568 B2 | * | 6/2006 | Yamaguchi et al. | ......... 349/155 |
| 2003/0112407 A1 | * | 6/2003 | Nakano et al. | .............. 349/187 |
| 2005/0084777 A1 | * | 4/2005 | Kawase | .......................... 430/7 |

FOREIGN PATENT DOCUMENTS

| | | |
|---|---|---|
| CN | 1323697 A | 11/2001 |
| JP | 8327807 | 5/1995 |

* cited by examiner

*Primary Examiner*—Joseph M Pelham
(74) *Attorney, Agent, or Firm*—Wei Te Chung

(57) ABSTRACT

An apparatus for manufacturing a printed light guide plate includes a working platform (23), and a heater (24) coupled to the working platform. A transparent slab (21) is disposed on the working platform. The purpose of coupling the heater to the working platform is to maintain the transparent slab a constant temperature in the range from about 40° C. to about 45° C., such that as few water molecules as possible are absorbed into the transparent slab. The quality of the manufactured printed light guide plate is thus improved.

3 Claims, 2 Drawing Sheets

METHOD AND APPARATUS FOR MANUFACTURING PRINTED LIGHT GUIDE PLATE

BACKGROUND OF THE INVENTION

1. Field of the Invention

The present invention relates generally to a method and an apparatus for manufacturing printed light guide plates, particularly printed light guide plates used for liquid crystal display devices.

2. Prior Art

Since liquid crystal material in a liquid crystal display panel does not itself emit light, a light source module, such as a back light module, must be used with the liquid crystal display panel in order to provide the needed illumination. The back light module provides the liquid crystal display panel with a homogeneous surface light source having sufficient luminance. The light source module comprises a light guide plate, which is a key element for generating the homogeneous surface light source.

FIG. 1 illustrates a typical light guide plate 1. The light guide plate 1 comprises a transparent slab 11, and a plurality of scattering dots 12. The transparent slab 11 has a first surface 111 for emitting homogeneous surface light, a second surface 112 opposite to the first surface 111, and a side surface 113 for receiving incident light from a light source such as a fluorescent light tube. The scattering dots 12 are disposed on the second surface 112, in order to destroy the total internal reflection of the incident light. This enables homogeneous light to emit through the first surface 111.

There are in general two manufacturing processes for manufacturing the light guide plate 1; that is, a printing process and a non-printing process. A typical printing process comprises the steps of: injection molding the transparent slab 11; printing the plurality of scattering dots 12 on the second surface 112 of the transparent slab 11, the scattering dots 12 comprising materials such as $SiO_2$ or $TiO_2$ having high light scattering characteristics; and curing the transparent slab 11 in order to fix the scattering dots 12 on the second surface 112.

However, the transparent slab 11 may absorb moisture from the air before the printing process actually commences, and this may reduce the quality of the printed scattering dots 12. In addition, the printed transparent slab 11 may absorb water and organic solution from the printing ink. As a result, the transparent slab 11 may deform during the curing process. Therefore, a new manufacturing method and supporting apparatus that overcome these problems is needed.

SUMMARY OF THE INVENTION

Accordingly, one objective of the present invention is to provide a method and an apparatus for manufacturing a printed light guide plate which reduces the absorption of water and/or organic solution in an injection molded transparent slab.

Another objective of the present invention is to provide a method and an apparatus for manufacturing a printed light guide plate that enables a transparent slab to be maintained at a constant temperature during printing.

In brief, the method for manufacturing a printed light guide plate according to the present invention comprises the steps of providing a transparent slab, printing a plurality of scattering dots on a second surface of the transparent slab while maintaining the transparent slab in a constant temperature, and curing the printed transparent slab in order to fix the scattering dots on the second surface of the transparent slab. Appropriate apparatus supporting the method is also provided.

DETAILED DESCRIPTION OF THE INVENTION

Figure 1:
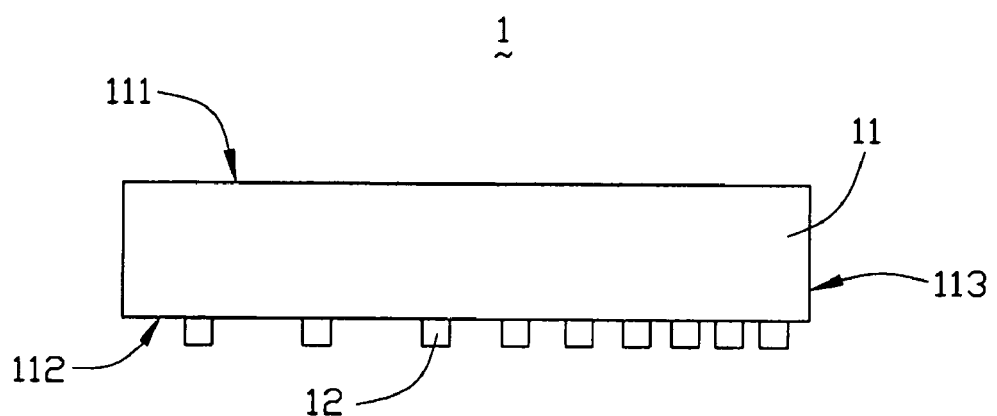
FIG. 1 is a side elevation of a typical printed light guide plate known in the art.
Figure 2:
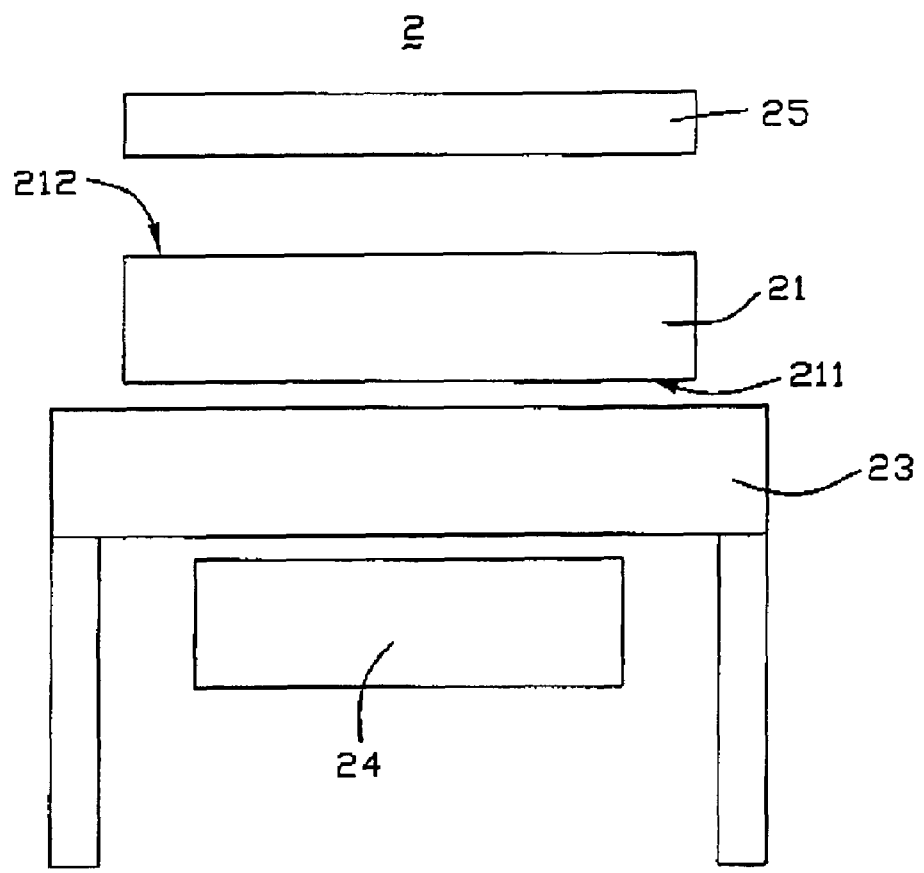
FIG. 2 is a schematic, side elevation of an apparatus for manufacturing a printed light guide plate in accordance with the present invention, together with a transparent slab.

Referring to FIG. 2, an apparatus 2 for manufacturing a printed light guide plate 21 is illustrated. As shown, the apparatus 2 comprises a working platform 23, a heater 24 coupled to the working platform 23, and printing means 25. The heater 24 is disposed below the working platform 23, and the printing means 25 is associated with the working platform 23. The heater 24 in this particular embodiment is a resistance heater adapted to maintain a given constant temperature. A transparent slab 21 having a first surface 211 and a second surface 212 is disposed on the working platform 23, with the first surface 211 in contact with the working platform 23. In this particular embodiment, the transparent slab 21 is made of polymethyl methacrylate (PMMA). The printing means 25 is configured for printing a plurality of scattering dots on the second surface 212.

Suppose that, at temperature T, there are N water molecules being absorbed in the PMMA material, there are n sites vacant for occupation in the PMMA material, and each water molecule requires an energy of $\Delta H$ in order to leave the PMMA material. One may obtain a free energy of this configuration as $\Delta G = n \Delta H - T\, dS$, where $S = k\, \ln W$ and $W = N!n!/(N+n)!$. Here, k denotes the Boltzmann constant. The equilibrium condition at a constant temperature T is $(dG/dn)_T = 0$, thus giving rise to a result that $(n/N) = \mathrm{Exp}\,(-\Delta H/kT)$. One can clearly see that for a higher temperature T, there are more vacant sites; i.e. fewer water molecules are absorbed in the PMMA material. However, at temperatures higher than 50° C., the PMMA material becomes easily deformable. Therefore, the temperature of the PMMA in this particular embodiment should be maintained between approximately 40° C. and 45° C.

The method of the present invention for manufacturing a printed light guide plate is hereinafter described. First, the transparent slab 21 having the first surface 211 and the second surface 212 is disposed on the working platform 23 such that the first surface 211 contacts the working platform 23. Then, the heater 24 is turned on, and the working platform 23 is heated such that the transparent slab 21 is maintained at a given constant temperature. In this particular embodiment, the temperature is in the range from approximately 40° C. to approximately 45° C. At the same time, the printing means 25 prints a plurality of scattering dots on the second surface 212 of the transparent slab 21. Finally, the printed transparent slab 21 is cured in an oven so as to firmly fix the plurality of scattering dots on the second surface 212 of the transparent slab 21. The printed light guide plate is thus manufactured.

It is appreciated that the above disclosure provides only a preferred embodiment of the present invention. Any person having ordinary skill in the art may easily find various other embodiments equivalent to the features of the present invention. Therefore, the scope of the present invention is to be construed according to the appended claims as set forth herein.

What is claimed is:

1. An apparatus for manufacturing a printed light guide plate, comprising:
   a working platform configured for supporting a transparent slab having a first surface and an opposite second surface, whereby the first surface contacts the working platform;
   a heater coupled with said working platform configured for maintaining the transparent slab at a constant temperature; and
   printing means associated with the working platform, the printing means being configured for printing a plurality of scattering dots on the second surface of the transparent slab while the heated working platform supports the transparent slab.

2. The apparatus as recited in claim 1, wherein the constant temperature is in the range from approximately 40° C. to approximately 45° C.

3. The apparatus as recited in claim 1, wherein said heater is a resistance heater.

* * * * *

UNITED STATES PATENT AND TRADEMARK OFFICE
CERTIFICATE OF CORRECTION

PATENT NO. : 7,488,918 B2
APPLICATION NO. : 10/769256
DATED : February 10, 2009
INVENTOR(S) : Chang-Chih Sung It is certified that error appears in the above-identified patent and that said Letters Patent is hereby corrected as shown below:

Title Page, Item (54) should read

--(54)   APPARATUS FOR MANUFACTURING PRINTED LIGHT GUIDE PLATE--.

Signed and Sealed this

Twenty-second Day of September, 2009

David J. Kappos
*Director of the United States Patent and Trademark Office*

UNITED STATES PATENT AND TRADEMARK OFFICE
CERTIFICATE OF CORRECTION

PATENT NO. : 7,488,918 B2  Page 1 of 1
APPLICATION NO. : 10/769256
DATED : February 10, 2009
INVENTOR(S) : Chang-Chih Sung It is certified that error appears in the above-identified patent and that said Letters Patent is hereby corrected as shown below:

Title Page, Item (54) and column 1, lines 1-3 should read

--APPARATUS FOR MANUFACTURING PRINTED LIGHT GUIDE PLATE--.

This certificate supersedes the Certificate of Correction issued September 22, 2009.

Signed and Sealed this

Twenty-seventh Day of October, 2009

David J. Kappos
*Director of the United States Patent and Trademark Office*